United States Patent [19]
Prada et al.

[11] Patent Number: 5,558,766
[45] Date of Patent: Sep. 24, 1996

[54] HYDROCRACKING OF FEEDSTOCKS AND CATALYST THEREFOR

[75] Inventors: Ricardo Prada, Caracas; Robert T. Galiasso, Miranda; Yilda Romero, Aragua; Edito Reyes; Edilberto Rodriguez, both of Miranda, all of Venezuela

[73] Assignee: Intevep, S.A., Venezuela

[21] Appl. No.: 328,033

[22] Filed: Oct. 24, 1994

Related U.S. Application Data

[60] Division of Ser. No. 127,805, Sep. 28, 1993, Pat. No. 5,384,297, which is a continuation-in-part of Ser. No. 837,806, Feb. 18, 1992, Pat. No. 5,254,240, which is a continuation-in-part of Ser. No. 697,118, May 8, 1991, Pat. No. 5,229,347.

[51] Int. Cl.$^6$ ............................................. C10G 65/10
[52] U.S. Cl. ........................... 208/59; 208/58; 208/111
[58] Field of Search ................................ 208/58, 59, 111

[56] References Cited

U.S. PATENT DOCUMENTS

| | | | |
|---|---|---|---|
| 2,897,135 | 7/1959 | Doumani | 208/112 |
| 2,946,739 | 7/1960 | Gardner et al. | 208/112 |
| 3,016,346 | 1/1962 | O'Hara | 208/216 R |
| 3,099,618 | 7/1963 | Gardner et al. | 208/112 |
| 3,184,404 | 5/1965 | Flinn et al. | 208/112 |
| 3,306,839 | 2/1967 | Vaell | 208/59 |
| 3,830,752 | 8/1974 | Mickelson | 502/211 |
| 4,120,825 | 10/1978 | Ward | 502/64 |
| 4,465,790 | 8/1984 | Quayle | 502/309 |
| 4,581,126 | 4/1986 | Day et al. | 208/138 |
| 4,740,487 | 4/1988 | Matheson et al. | 502/66 |
| 4,816,538 | 3/1989 | Abdo | 502/66 |
| 5,071,805 | 12/1991 | Winslow et al. | 502/66 |
| 5,086,027 | 2/1992 | Singhal et al. | 502/166 |
| 5,168,085 | 12/1992 | Addiego et al. | 502/66 |
| 5,187,133 | 2/1993 | Yoshinari et al. | 502/66 |

Primary Examiner—Glenn A. Caldarola
Assistant Examiner—Walter D. Griffen
Attorney, Agent, or Firm—Olson & Hierl, LTD.

[57] ABSTRACT

A tri-elemental catalyst on a support that includes a pentasil crystalline zeolite and is suitable for hydrocracking and hydrogenation of aromatics-containing petroleum hydrocarbon feedstocks such as hydrotreated cracked feedstock, virgin feedstock, vacuum distillate, middle distillate, mixtures thereof, and the like, is disclosed. The catalyst is suitable for hydrodesulfurization as well as hydrodenitrogenation, thus the feedstock can contain sulfur and nitrogen in addition to the aromatic components. Hydrocracking and aromatics hydrogenation of the petroleum hydrocarbon feedstocks is accomplished under a relatively wide range of process conditions in plural process zones using the tri-elemental catalyst that contains a catalytically active metal phase constituted by a Group VI-B element, a Group VIII first transition series element and a Group VIII second transition series element. In an upstream zone the catalytically active metal phase is supported on a titania-alumina support containing about 5% to about 30% by weight titania in the support. In a downstream zone the catalytically active metal phase is supported on a titania-alumina-pentasil crystalline zeolite support. The preferred pentasil crystalline zeolite is ZSM-5.

25 Claims, 1 Drawing Sheet

HYDROCRACKING OF FEEDSTOCKS AND CATALYST THEREFOR

CROSS-REFERENCE TO RELATED APPLICATION

This application is a division of application Ser. No. 08/127,805, filed Sep. 28, 1993, now U.S. Pat. No. 5,384,297, which is a continuation-in-part of application Ser. No. 07/837,806, filed Feb. 18, 1992, now U.S. Pat. No. 5,254,240, which is a continuation-in-part of application Ser. No. 07/697,118, filed May 8, 1991, now U.S. Pat. No. 5,229,347.

TECHNICAL FIELD

This invention relates to a catalyst and the uses of such catalyst in hydrocracking processes for cracked and virgin (straight run) petroleum distillates and residues to produce relatively high value products having a relatively low pour point.

BACKGROUND OF THE INVENTION

Hydrocracking is a catalytic process which has achieved widespread use in petroleum refining for converting various heavy petroleum fractions into lighter fractions and more valuable products, especially gasolines, jet fuels, diesel oils, heating oils and lubes oils.

In a typical hydrocracking process, the petroleum feedstock is brought into contact with a catalyst at temperatures in the range of about 250° C. to about 430° C., hydrogen pressure in the range of about 200 to about 2000 psi, and space velocity in the range of about 0.5 to about 2.5 $h^{-1}$.

The catalysts are all of the bifunctional type, combining an acid function with a hydrogenating-dehydrogenation function. The acid function is provided by catalytic support of relatively large surface area (about 150 to 600 $m^2/g$) having a specific surface acidity, such as halogenated alumina, amorphous silica alumina and zeolite. The hydrogenating-dehydrogenation function is provided either by one or several metals of Group VIII of the Period Table of Elements in the sulfided or reduced state, such as palladium, ruthenium or platinum, or by a combinaction of at least two or more metals chosen from Group VIB of the Periodic Table of Elements, such as molybdenum or tungsten in particular, and Group VIII of the Periodic Table of Elements such as cobalt or nickel. At least two of the metals of such a combination belong to two different Groups (Group VI and Group VIII as previously mentioned), and in order of preference, $NiO-WO_3$, $NiO-MoO_3$, $CoO-Mo_3$ and $CoO-Wo_3$.

The conventional catalysts in catalytic hydrocracking are mostly moderately acidic substrates, such as silica-alumina, a combination of boron or titania, and fluorinated aluminum oxides or phosphates of alumina. These catalytic systems are often used to produce very good quality middle distillates, or oil bases. Many hydrocracking catalysts on the market consist of silica-alumina combined with the aforementioned metals of Groups VIB and VIII of the Periodic Table of Elements. These catalyst systems have very good middle distillate selectivity. The products formed are of good quality. These catalysts can also produce lubricating bases. The disadvantage of all these catalyst systems, all based on an amorphous catalyst support, is their low activity, however.

Acid zeolites, on the other hand, have the advantage over the other previously mentioned acidic substrates of providing a much higher degree of acidity. Hydrocracking catalysts which contain such zeolites are therefore much more active, and for that reason permit relatively lower process temperature and/or a higher feed space velocity. The higher acidity modifies the equilibrium between the cracking and hydrogenating catalytic functions, respectively. Zeolite-based hydrocracking catalysts have a relatively higher cracking capability, and therefore produce more yield in gasolines, jet fuels and/or middle distillates than conventional ones.

In order to obtainsspecific products, considerable effort has been made to develop and commercialize highly active and selective catalysts for hydroconversion of heavy distillation fractions and residue into middle distillates, jet fuels and lube oils and for deep hydrogenation of aromatic compounds contained in these fractions.

For example, U.S. Pat. No. 5,229,347 to Prada et al. describes mild hydrocracking and deep hydrogenation of aromatics with a catalyst comprising nickel, tungsten, and ruthenium or palladium on a co-precipitated support of alumina-titania. The support is prepared from solution of aluminum sulfate, titanyl chloride ($TiOCl_2$), and sodium aluminate. Titania in the support constitutes more than 5 wt-%. Catalytic metals are then impregnated onto the support following one or more sequential impregnation steps.

U.S. Pat. No. 5,009,768 to Galiasso et al. describes a hydrocracking process that requires two or more hydrotreatment stages followed by hydrocracking using a catalyst bed of a particular composition for the mild hydrocracking stage.

U.S. Pat. No. 4,855,530 to LaPierre et al. describes a process for isomerizing relatively long chain paraffins. The catalyst used in the described process is a large pore zeolite such as a Y-type zeolite, beta-type zeolite, or ZSM-20 zeolite.

U.S. Pat. No. 4,797,195 to Kukes et al. discloses three reaction zones in series in a hydrocracking process which comprises: a first reaction zone where the hydrocarbon feedstock with hydrogen is contacted with a nickel-molybdenum support on alumina catalyst, a second reaction zone where the effluent from the first reaction zone is contacted with a nickel-tungsten deposited on a support consisting of an alumina component and a crystalline molecular sieve, specifically a Y-type zeolite, and a third reaction zone where the effluent from the second reaction zone is contacted with a catalyst comprising a cobalt-molybdenum system deposited on a support component comprising a silica-alumina and a crystalline molecular sieve component, specifically a Y-type zeolite.

U.S. Pat. No. 4,495,061 to Mayer et al. discloses a hydrocarbon conversion process using a particular catalyst in connection with petroleum distillates and solvent—deasphalted residual feeds containing nitrogen impurities at levels below about 10 ppmw to produce high value lube oil stock and fuel products. The catalyst comprises: a porous amorphous matrix consisting of alumina-silica-titania polygels, a hydrogenation component consisting of combinations of nickel-molybdenum or nickel-tungsten metals and a crystalline alumino silicate of the ZSM-series in the ammonium or the protonic form. A second catalyst is disposed downstream of a reaction zone in which the feed is contacted under hydroprocessing conditions with an active hydrodenitrogenation function. The hydrodenitrogenation catalyst contains an inorganic matrix oxide consisting of alumina, silica, magnesia or a mixture thereof, and at least one hydrogenation component selected from the Group VIB and Group VIII elements, and a silicaceous molecular sieve component substantially in the ammonium or hydrogen form.

U.S. Pat. No. 3,016,346 to O'Hara describes a nickel-molybdenum catalyst supported on alumina and a smaller amount of titania (0.5 to 5.0% by weight). The catalyst contains molybdenum, cobalt and nickel. The catalyst has hydrodenitrogenation activity and also inhibits those hydrocracking reactions which result in excessive coke deposits on the catalysts when the catalyst is used for hydrotreating a thermally cracked middle fraction in a standard relative activity test. The alumina-titania support in O'Hara is prepared by co-precipitation of aluminum and titanium hydroxides from a solution of titanium tetrachloride, an aqueous ammonium hydroxide solution and aluminum chloride, and contains 3.7% by weight of titanium.

U.S. Pat. No. 4,465,790 to Quayle discloses a hydrodenitrogenation catalyst comprising catalytic molybdenum and nickel on a co-precipitated support of alumina and titania. The support is co-precipitated from solutions of the sulfates of aluminum and titanium. Titania in the support constitutes more than 5% by weight of the catalyst. The resulting hydrogel is processed using standard techniques to form a catalyst support. Catalytic metals are then impregnated onto the support. However, this particular catalyst has relatively poor mechanical properties and is difficult to extrude during manufacture.

European Patent Application 0 199 399 discloses a method for making a hydrocarbon conversion catalyst with improved hydrodesulfurization and hydrodenitrogenation activity. The catalyst contains a Group VI-B metal that is either molybdenum or tungsten and a Group VIII metal that is either cobalt or nickel that are incorporated into a titania-containing alumina support. The catalyst is prepared by mulling together alpha aluminum monohydrate and titanium dioxide at a molar ratio of $Al_2O_3:TiO_2$ ranging from 3:1 to 5:1, acetic acid in a concentration ranging from 2.5 to 3.5 parts of acid per 100 parts of $Al_2O_3$ by weight, and sufficient water to produce an extrudabe mixture. The mixture is then extruded and calcined. The metals are impregnated onto the support by conventional methods.

SUMMARY OF THE INVENTION

Tri-elemental catalyst, having three catalytically active metals supported on a titania-alumina and pentasil crystalline zeolite support, is used under specific operating conditions to hydrocrack and hydrogenate petroleum hydrocarbon feedstock having a relatively high aromatic content.

The catalyst comprises a porous, catalytically active support comprising alumina, titania and a pentasil crystalline zeolite in which the alumina is present in an amount in the range of about 95 parts by weight to about 70 parts by weight, the titania in an amount in the range of about 0.01 parts by weight to about 10 parts by weight, and the zeolite is present in an amount in the range of about 5 to about 50 parts by weight. The porous support has a surface area in the range of about 200 $m^2$/gram to about 450 $m^2$/gram and at least about 95 percent of the pores thereof have a pore diameter in the range of about 20 Angstroms to about 600 Angstroms. Three catalytically-active moieties are present on the support. These moieties consist essentially of a transition element of Group VIB of the Periodic Table of Elements, a transition element of the first transition series of Group VIII of the Periodic Table of Elements, and a transition element of the second transition series of Group VIII of the Periodic Table of Elements. The Group VIB transition element is present in an amount in the range of about 5 weight percent to about 30 weight percent, expressed as the weight of the corresponding oxide and based on the weight of the catalyst, the Group VIII first transition series element is present in an amount in the range of about 2 weight percent to about 10 weight percent, expressed as the weight of the corresponding oxide and based on the weight of the catalyst, and the Group VIII second transition series element is present in an amount in the range of about 0.005 weight percent to about 1 weight percent, expressed as the weight of the metal and based on the weight of the catalyst.

The catalyst is contacted with the petroleum hydrocarbon feedstock in a reactor under hydrocracking conditions and while at least about 60 volume percent of the reactor void volume is occupied by a gaseous mixture of hydrogen and vaporized feedstock so as to produce a product having a reduced aromatic content, usually less than about 20 percent by volume.

It has been found that the maintenance of a certain hydrocarbon vapor loading in the hydrocracking reactor or reactors while minimizing the internal liquid hold up in the reactor substantially increases the yield and quality of the desired middle distillates, e.g., diesel fuel and/or jet fuel, when using the trimetallic catalysts described hereinbelow. In addition, the present process can utilize feedstocks having a much higher sulphur and nitrogen content in the hydrocracking stage than those of previous art.

The above mentioned petroleum feedstock, typically cracked, and/or cracked plus cracked and virgin feedstocks, is contacted in a first reaction zone with a catalyst comprising the aforementioned three catalytically active metals deposited on a support comprising a titania-alumina component. The effluent from the first reaction zone is then contacted in a second reaction zone with a catalyst comprising the three catalytically active metals deposited on a support comprising a titania-alumina component and a pentasil crystalline zeolite (molecular sieve) component, optionally previously modified by dealumination and/or cation exchange with a certain amount of nickel and ruthenium or palladium ions, or the like. The petroleum hydrocarbon feedstock is passed through a combined catalytic bed or separate reactors under hydrocracking conditions and preferably while at least about 60 volume percent of the reactor void volume fraction is occupied by a gaseous mixture of hydrogen and vaporized feedstock so as to produce a product having a reduced aromatic content, usually less than about 20 percent by volume, and a relatively low pour point, usually less than about 10° C.

DETAILED DESCRIPTION OF PREFERRED EMBODIMENTS

Figure 1:
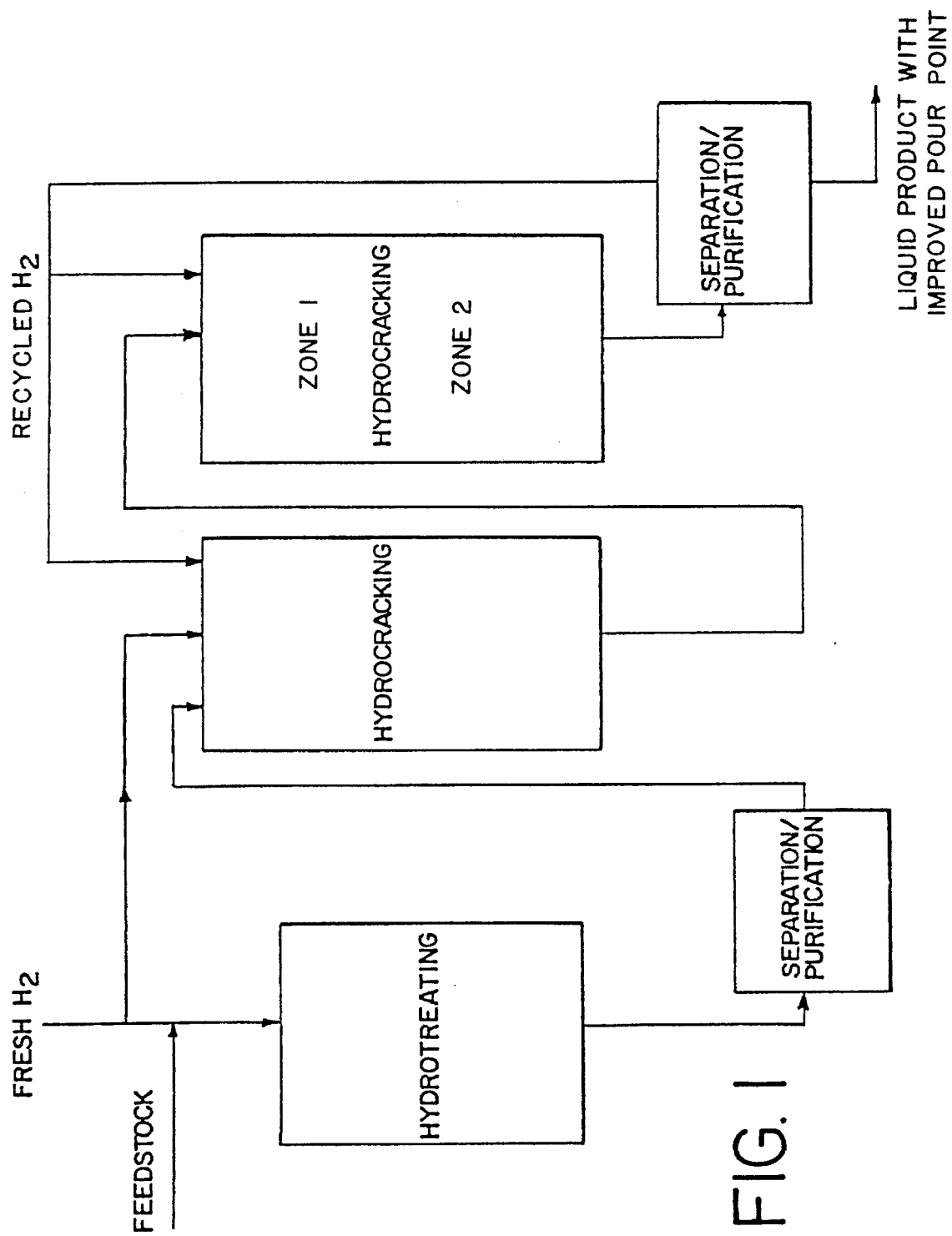
FIG. 1 is a flow diagram showing the overall process of the invention.

One aspect of the present invention is a hydrocracking and deep hydrogenation process that utilizes a unique catalytic system having several catalytically active elements on special supports for processing feedstocks relatively high in aromatics in multiple zones having a different catalyst support.

The feedstocks particularly well suited for the present process are the relatively high boiling feedstocks of petroleum hydrocarbon origin, typically cracked, and cracked plus virgin feedstocks, such as heavy and light gas oils, and a mixture of heavy gas oils and vacuum bottoms, deasphalted oil, heavy vacuum gas oil, middle distillate oil, all having a relatively high aromatic content. These feedstocks, preferably after hydrotreating, can be readily converted to high quality lower boiling products such as diesel fuel, jet fuel, and the like, in good yields and having a relatively lower aromatic content. Relatively small amounts of gasoline and gases are formed during the process. The unconverted material is suitable for lube oil or fluid catalytic cracking feedstock.

For high quality diesel fuel and jet fuel production, it is preferred that the feedstock is first subjected to a hydrotreatment that reduces the metal content (if present) as well as the sulfur and nitrogen contents thereof. For that purpose, specialized deep hydrotreatment processes can be utilized. It is particularly preferred to use the demetalization, hydrodenitrogenation, and hydrodesulfurization processes described in commonly owned U.S. Pat. No. 5,009,768 to Galiasso et al. for such treatments.

The preferred petroleum hydrocarbon feedstock has a boiling end point above about 400° F. (about 205° C.) and higher, usually above about 600° F. (about 315° C.), as well as a relatively low sulfur content (about 3000 ppm or less) and nitrogen content (about 600 ppm or less). The boiling characteristics of the particular feedstock are flexible. For the production of middle distillates such as diesel fuel and jet fuel, the feedstock can include light as well as heavy fractions, and the hydrocracking/hydrogenation functions are adjusted with operating conditions. Thus, especially for jet fuel production, catalytically or thermally cracked gas oils, e.g., light cycle oil and heavy cycle oil, are particularly well suited as a feedstock for the presently contemplated process. The cycle oils from catalytic cracking processes typically have a boiling range of about 400° F. to about 1050° F. (about 205° C. to about 530° C.). Typical aromatic content is in the range of 50 to 80% by weight. For production of lube oil having a relatively low pour point, the feedstock can include relatively high boiling hydrocarbons, typically heavy distillates, heavy straight run gas oils and heavy cracked or coked cycle oils, as well as fluidized catalytic cracking unit feeds.

The overall process is illustrated in FIG. 1. A petroleum feedstock, after hydrotreating, is subjected to a preliminary hydrocracking treatment and thereafter to further hydrocracking treatment in multiple zones each having a different catalyst bed. Each reaction zone can comprise one or a plurality of beds, preferably with intrabed quench to control temperature rise due to the exothermic nature of the hydrocracking and hydrogenation reactions. The charge stock may be a liquid or liquid-vapor phase mixture, depending upon the temperature, pressure, proportion of hydrogen, and particular boiling range of the feedstock processed. In the first zone (ZONE 1) the catalyst bed contains a trimetallic catalyst of the type described in U.S. Pat. No. 5,229,347 to Prada et al., and in the second zone (ZONE 2) downstream from the first zone the catalyst bed contains a trimetallic catalyst on a support constituted by titania, alumina, and pentasil crystalline zeolite (ZSM-type zeolite) as will be discussed in greater detail hereinbelow.

The catalyst support for the first zone is made of alumina and titania, and is manufactured by co-precipitation as a hydrogel of an aqueous titanyl ($TiO^{2+}$) salt solution combined with an aluminum sulfate solution. Co-precipitation is effected by the addition of a sodium aluminate solution. Illustrative of such titanyl salt solutions are the titanyl halide, e.g., titanyl chloride ($TiOCl_2$), and titanyl sulfate ($TiOSO_4$) solutions. Preferably, a Group VI-B transition element of the second or third transition series, namely molybdenum (Mo) or tungsten (W), is present together with a Group VIII transition element of the first transition series, namely cobalt (Co), nickel (Ni) or iron (Fe), and a Group VIII transition element of the second transition series, namely ruthenium (Ru), rhodium (Rh) or palladium (Pd), as the three catalytically active elements on the porous alumina and titania support.

It has been found that by utilizing a titanyl ($TiO^{2+}$) salt to prepare the catalytic support, sulfates can be more readily removed during washing of the produced hydrogel. In addition, the use of a titanyl salt permits more efficient extrusion of the catalyst support and provides enhanced texture as well as enhanced surface acidity for the catalyst support. Suitable titanyl salt solutions can be readily obtained upon hydrolysis of titanium tetrachloride or titanium trichloride.

The amount of titania in the produced catalyst support is about 5% to about 30% by weight, preferably about 6% to about 15% by weight, of the catalyst support. By preparing the support in this manner, the titanium and the aluminum ions are more intimately intermixed throughout the support which facilitates substitution of the metals for each other in the support matrix. This, in turn, makes the support more acidic. An optimum support surface acidity is achieved when the molar ratio of titanium to aluminum in the support is about 1:9.

The precipitated alumina and titania hydrogels are spray dried, and the resulting dried powders are then blended in the presence of an aqueous organic acid such as acetic acid. If desired, an aqueous inorganic acid, such as nitric acid, can also be used. An aqueous acid solution that has an acetic acid concentration of about 0.35M to about 0.5M (about 2% to about 3% acetic acid by volume) is preferred. The powder and solution are blended into a paste and extruded. The extruded paste is dried at a temperature of about 30° C. to about 80° C., preferably about 60° C., for about 2 hours and at a temperature of 60° C. to about 150° C., preferably about 120° C., for 3 hours. The dried support is then calcined at a temperature of about 300° C. to about 400° C., preferably about 350° C., for 2 hours, and at a temperature of 450° C. to about 600° C., preferably about 550° C., for about 3 hours.

The prepared catalyst support has a surface area in the range of about 130 m$^2$/g to about 300 m$^2$/g, preferably about 140 m$^2$/g to about 250 m$^2$/g. The pore volume of this catalyst support is in the range of about 0.4 cm$^3$/g to about 0.8 cm$^3$/g, preferably about 0.45 cm$^3$/g to about 0.65 cm$^3$/g. The pore size range in the catalyst support is about 20 Å to about 500 Å in diameter. At least about 95% of the total pore volume falls within this range.

The surface area and distribution of the pores in a representative catalytic support of the present invention was determined using the nitrogen Brunauer-Emmett-Teller (B-E-T) method described in Brunauer et al., J. Am. Chem. Soc. 60:309 (1938). The results are provided in Table I below:

TABLE I

| Typical Pore Diameter Distribution In The Catalytic Support | |
|---|---|
| Average Pore Diameter | % Distribution |
| <30 | 5 |
| 30 to <60 | 27.1 |
| 60 to <90 | 28.4 |

TABLE I-continued

Typical Pore Diameter
Distribution In The Catalytic Support

| Average Pore Diameter | % Distribution |
| --- | --- |
| 90 to <150 | 25 |
| 150 to <300 | 6 |
| 300 to 600 | 6 |
| >600 | 2.5 |

The extruded catalyst support spheres or pellets are preferably about 0.25 cm to about 0.08 cm in diameter. The extruded particles are approximately 2.5 to about 4 mm long. The structural strength (bed strength) of the catalyst is about 7 kg/cm$^2$ to about 20 kg/cm$^2$.

The three metal moieties that constitute the catalytically active phase are loaded onto the catalyst support in a two or three step procedure. Initially, a Group VI-B element is impregnated onto the support. The Group VI-B element is preferably impregnated onto the support in the form of a metal salt solution, preferably a tungsten or molybdenum salt, with a metal concentration sufficient to provide a concentration of about 6% to about 30%, preferably about 12% to about 30% of the VI-B metal (expressed as weight of the corresponding metal oxide) by weight of the catalyst. In a preferred embodiment, the impregnating solution is buffered at a pH of about 4 to about 6. The impregnated catalyst is dried at a temperature of about 30° C. to about 150° C., preferably in two steps, 60° C. for 2 hours and 120° C. for 3 hours. In some cases, the catalyst is additionally calcined first at a temperature of about 300° C. to 400° C. for about 2 hours and then at about 450° C. to about 550° C. for about 3 hours. The impregnated support is then further co-impregnated with a solution of a Group VIII (first transition series) element, i.e. cobalt, nickel or iron, preferably cobalt or nickel, and a Group VIII second transition series element, i.e., ruthenium (Ru), rhodium (Rh) or palladium (Pd), preferably Ru or Pd. Preferably about 2% to about 10% by weight of the Group VIII element (first transition series), expressed as the weight of the corresponding oxide and based on the weight of the catalyst, is loaded onto the support. The Group VIII second transition series element is loaded onto the support in an amount of about 0.01% to about 1% by weight based on total catalyst weight. The impregnating solution is preferably buffered at a pH of about 4 to about 6. In a preferred impregnating solution the NiO concentration is about 40 to about 160 g/l and the Ru concentration is about 1 to about 12 g/l. The further impregnated catalyst is dried at a temperature of about 30° C., to about 150° C., preferably 60°–120° C., for about 3 hours, and calcined at a temperature of about 300° C. to about 400° C. for about 2 hours and at about 450° C. to about 500° C. for about 3 hours.

In an alternative method of preparation (Example 2), the impregnated (Group VI-B) and dried support is impregnated, dried and calcined in a second stage with a solution of Group VIII (first transition series) element at solution and operating conditions the same as those in the previously described procedure, and then impregnated, dried and calcined with a Group VIII (second transition series) element in a third stage at solution, drying and calcining conditions the same as those in the previous stages.

This particular combination of preferred metals loaded onto the titania/alumina support described herein provides a metal dispersion on the catalyst support that enhances the hydrogenating function of the catalyst. This particular combination of metals also enhances the activity of the Group VIII (first transition series)/Group VI-B system, which saturates carbon-to-carbon double bonds in the feedstock aromatics and provides resistance to catalyst deactivation by the build-up of coke deposits. The Group VIII (first transition series)/Group VI-B system offers enhanced hydrogenation capacity due to the presence of the Group VIII (second transition series) element.

By utilizing the aforesaid double or triple impregnating process, the use of additives to prevent metal precipitation in the impregnated solutions is not required. Furthermore, the impregnation permits better penetration of the Group VI-B elements into the porous catalyst support.

The catalyst described hereinabove offers improved dispersion of the catalytically active elemental moieties impregnated onto the support. The properties of the catalyst are directly related to the dispersion of the active elements on the surface of the support.

The dispersion of the elements on the catalyst support can be measured by X-ray photo-electron spectroscopy (XPS). The signals emitted during XPS enable the quantity of elements on the catalyst surface to be determined and calculated.

The XPS techniques consists of exciting the atoms of the material by means of X-rays and measuring the energy spectrum of the electrons emitted by photoemission. As the X-rays penetrate only a few angstroms of the catalytic support, the spectrum obtained is a measure of the quantity of the element present on the surface of the catalyst. The XPS measurements are made using a Leybold LHS-10 apparatus which consists of an X-ray source, an energy analyzer and a detector system. The apparatus is operated at an energy level of $hυ$1253.6 eV supplied by a magnesium cathode (Mg K) drawing 300 watts at a step energy of 50 eV. Carbon (1s, 285 eV) and aluminum (2p, 74.8 eV) are taken as standards for calculating the bonding energies.

The surface dispersion of the metals is determined by measuring the total area for the XPS signal intensity peak corresponding to each of the metals loaded onto the catalyst. The signal band strength ratio for each element is calculated by dividing the area of the peak for the particular element by the combined area of the particular element and the area of the aluminum peak. For example, if the dispersion of cobalt on the support is to be determined, the area of the cobalt peak, represented by Co, is divided by the combined area of the cobalt peak and the aluminum peak, represented by Al, the general formula is: (Co)/(Co+Al).

The signal band strength ratios for the metals on the support in a preferred embodiment of this invention are about 3 to about 9 for the Group VI-B element on the catalyst, i.e., Group VI-B/(Group VI-B+Al); about 4 to about 12 for the Group VIII first transition series element loaded on the catalyst, i.e., Group VIII (first transition series)/[Group VIII (first transition series)+Al]; about 0.01 to about 3, preferably about 0.1 to about 3, for the Group VIII (second transition series) element on the catalyst, i.e., Group VIII (second transition series)/[Group VIII (second transition series)+Al]; and about 0.3 to about 10, preferably about 1 to about 10, for the titanium on the surface of the catalyst, i.e., Ti/(Ti+Al).

Prior to use, the oxide precursor catalyst is activated by reduction-sulfidation reactions which convert the acidic, supported metals into metallic sulfides which are the catalytically active species during the hydrotreatment. The sulfidation process takes place in an atmosphere of $H_2S/H_2$. The atmosphere contains about 1% to about 10% by weight sulfur. The sulfidation process takes place at atmospheric pressure and at a temperature of about 200° C. to about 450° C.

The sulfidation process, and thus the activation of the catalyst, may also occur in a two phase, gas-liquid mixture of $H_2$ and a vacuum gas oil or a light oil containing about 0.5% to about 5% by weight of sulfur from a sulfiding agent (spiking agent) such as, e.g. dimethyl sulfide, dimethyl disulfide, carbon disulfide, and the like. This alternate sulfidation process is carried out at a pressure of about 200 psig to about 600 psig, and a temperature of about 230° to about 400° C., with stepwise temperature increases of about 15° C. to about 30° C. per hour. The volumetric space velocity of the gas-liquid mixture during sulfidation is about 1 to about $3h^{-1}$.

The preferred first zone hydrogenation catalyst comprises tungsten, nickel and ruthenium or palladium on the aforesaid support. These metals and/or their oxides are present in the amounts specified below. These amounts are based on total weight of the catalyst, and are calculated as the $WO_3$, NiO and/or Ru or Pd. The composition ranges thereof are presented in Table II, below.

TABLE II

| Component | Catalyst Composition for Zone 1 | | |
|---|---|---|---|
| | Overall | Preferred | Most Preferred |
| $WO_3$, wt-% | 6–30 | 12–30 | 15–25 |
| NiO, wt-% | 2–10 | 3–8 | 3–6 |
| Ru and/or Pd wt-% | 0.005–1 | 0.01–0.5 | 0.04–0.02 |

The catalyst support for the second zone includes, in addition to titania and alumina, a pentasil crystalline zeolite, a so-called ZSM-series crystalline aluminosilicate. The pentasil crystalline zeolites have a relatively high silica-alumina ratio and have a configuration of tetrahedra linked through four-, five-, and six-membered rings. The pentasil crystalline zeolites are also referred to as the ZSM series zeolites and are commercially available under the "ZSM" designation followed by a number. ZSM-5 zeolites are described in U.S. Pat. No. 3,702,886 to Argauer et al. Other members of the ZSM series are ZSM-11, ZSM-12, ZSM- 21, ZSM-23, ZSM-35 and ZSM-38. ZSM-11 is described in U.S. Pat. No. 3,709,979; ZSM-12 is described in U.S. Pat. No. 3,832,449, ZSM-21 and ZSM-38 are described in U.S. Pat. No. 3,948, 758, ZSM-23 is described in U.S. Pat. No. 4,076,842, ZSM-35 is described in U.S. Pat. No. 4,016,245.

This support is catalytically active. The alumina is present in an amount in the range of about 95 parts by weight to about 70 parts by weight, the titania in an amount in the range of about 0.01 parts by weight to about 10 parts by weight, and the pentasil crystalline zeolite in an amount in the range of about 5 to about 50 parts by weight. The presence of the pentasil crystalline zeolite together with titania in the support has been found to provide products with a relatively low pour point.

The present catalytically active support may be prepared by various methods well known in the art, as well as in accordance with the methods used for preparing the titania-alumina catalyst described hereinabove, and formed into pellets, beads and/or extrudates of the desired size. The crystalline molecular sieve material may be pulverized into finely divided material. The preferred zeolite employed in the catalytically active support contemplated by the present invention is a H-ZSM-5 type zeolite with a Si-Al atomic ratio in the range of about 20:1 to 100:1, preferably about 30:1 to 80:1. The H-ZSM-5 type zeolite can be modified, if desired, by means of well known cation (Me) exchange treatments.

For example, a Me-ZSM-5 zeolite can be prepared by replacing the original alkaline cation or protons associated with the molecular sieve by a variety of other cations according to techniques that are known in the prior art. The use of cation-exchanged zeolites increases hydrogenation activity as opposed to hydrocracking activity. It is preferable to carry out hydrogenation reactions prior to the hydrocracking reaction because the hydrocracking reaction takes place at a relatively faster rate with hydrogenated reactants. Deactivation of the catalyst due to build-up of coke deposits is minimized by incorporated of a hydrogenation function into the zeolite component. The cations suitable for the exchanged zeolites are combinations of both Group VIII first and second transition series elements, such as nickel-ruthenium, nickel-palladium, nickel-rhodium, cobalt-ruthenium, cobalt-palladium, and/or cobalt-rhodium. The amount of both Group VIII first and second transition series element present in the exchanged zeolitic material is about 0.005% to about 2% by weight, preferably about 0.005% to about 2% by weight, based on the corresponding zeolite.

The finely divided zeolite material may be intimately admixed with the refractory titania-alumina, e.g., by combining it with a hydrosol or hydrogel of the inorganic oxides. A thoroughly blended hydrogel may be spray dried and then combined with an aqueous organic acid such as acetic acid to form a paste suitable for extrusion. The preferred acid concentration is about 0.35M to about 0.5M (about 2% to 3% acid by volume). Extruded paste is dried and calcined at the same conditions as those for the first zone titania-alumina catalyst support, as described above. The prepared support preferably has a surface area in the range of about 200 $m^2/g$ to 450 $m^2/g$, more preferably about 230 $m^2/g$ to 350 $m^2/g$. The pore volume of the zeolite-containing catalyst support is in the range of about 0.4 $cm^3/g$ to about 0.8 $cm^3/g$, preferably about 0.65 $cm^3/g$ to about 0.75 $cm^3/g$. The pore size range in the catalyst support is about 20 Å to about 600 Å in diameter.

The three catalytically-active moieties on the support constitute a tri-elemental phase in which the Group VIB transition element is present in an amount in the range of about 5 weight percent to about 30 weight percent, expressed as the weight of the corresponding oxide and based on the weight of the catalyst, the Group VIII first transition series element is present in an amount in the range of about 2 weight percent to about 10 weight percent, expressed as the weight of the corresponding oxide and based on the weight of the catalyst, and said Group VIII second transition series element is present in an amount in the range of about 0.005 weight percent to about 1 weight percent, expressed as the weight of the metal and based on the weight of the catalyst. The second zone hydrogenation catalyst component preferably comprises tungsten, nickel and ruthenium or palladium. These metals are present in the same amounts as those specified hereinabove for the first zone catalyst. These metallic elements are loaded onto the titania-alumina-zeolite support by conventional impregnation techniques, and then dried and calcined using the same conditions as described above for the first zone catalyst.

Prior to use, the oxide precursor catalysts are activated by reduction-sulfidation reactions which convert the oxidic supported metals into sulfide ones which are the catalytically active species during the hydrocracking process. The activation step is important for optimizing the effectiveness of the catalysts. In fact, the activity and the selectivity can be strongly affected by the pretreatment conditions. At least four types of presulfiding techniques can be applied. These depend on the nature of the feedstock as well as the type of catalyst used in the process; such as, e.g., presulfidation in gas liquid phase carried out with the sulfur compounds contained in a normal feedstock, presulfidation in gas liquid-phase using a spiking agent in a normal feedstock, presulfidation in gas phase using an $H_2S-H_2$ or mercaptan-$H_2$ mixture, and ex-situ presulfidation using organic polysulfides. The preferred presulfidation method for this invention utilizes a two-phase, gas-liquid mixture of hydrogen and a vacuum gas oil (VGO), or a light gas oil (LGO), containing about 0.5% to about 5% by weight of sulfur from a sulfiding agent (spiking agent) such as dimethyl sulfide, dimethyl disulfide, carbon disulfide, organic poly-sulfides and the like. This sulfidation process is carried out at a pressure in the range of about atmospheric to about 600 psig, and at a temperature of about 150° C. to about 400° C., with stepwise temperature increases of about 10° C. to 30° C. per hour. The volumetric space velocity of the gas-liquid mixture during sulfidation is about 1 to about 3 $h^{-1}$.

The petroleum hydrocarbon feedstock (virgin and cracked), preferably is first treated in a hydrotreating stage in order to decrease its sulphur and nitrogen content, then contacted with the catalyst, under hydrocracking conditions, and while at least 30 percent by weight of the feedstock is in vapor phase. For diesel fuel production, it is sufficient that at least 30 percent by weight of the feedstock is in vapor state. For jet fuel production, preferably at least about 50 percent by weight of the feedstock is in vapor state. The contacting is effected for a time period sufficient to convert at least a portion of the petroleum hydrocarbon feedstock into diesel fuel or jet fuel, as the case may be, and to reduce the aromatics content thereof.

In the reactor, preferably at least about 60 percent of the reactor void volume is occupied by a gaseous mixture of hydrogen and vaporized feedstock. More preferably, at least about 80 percent of the reactor void volume is occupied by such gaseous mixture.

In the production of high quality diesel fuel or jet fuel from a cracked gas oil as the feedstock, the cracked gas oil preferably is first pre-treated in a mixed catalyst bed to reduce the sulfur and nitrogen content thereof as mentioned above. A desirable pre-treatment for this purpose is described in U.S. Pat. No. 5,009,768 to Galiasso et al. However, other convenient desulfurization and denitrogenation processes can be utilized as well. It is also desirable to remove from the cracked gas oil at least a portion of the hydrocarbon fraction thereof that boils below about 30° C., i.e., the $C_1$ to $C_2$ hydrocarbon fraction, to minimize the reactor volume requirements for the subsequent hydrocracking and hydrogenation stage or stages.

Typical such cracked feedstock contains initially above about 40 volume percent, usually about 40 to about 70 volume percent aromatics, about 0.1 to about 0.3 weight percent sulfur, and about 600 parts per million, by weight, of nitrogen. No metals such as vanadium or nickel are present. In general, the process flow during hydrocracking includes the mixing of a hydrogen-rich gas with the feedstock, heating of the resulting mixture, and contacting with a trimetallic hydrocracking catalyst in a reactor, usually a fixed bed reactor, under a predetermined hydrogen partial pressure and at the desired hydrocarbon vapor contents. Another possibility is to heat the hydrogen gas and the feedstock independently, and then mixing them. Hydrocracking processes usually can be operated at a temperature in the range of about 300° C. to about 460° C. and at a pressure in the range of about 100 psig to about 2,000 psig, sometimes as high as 3,000 psig.

The reactor or seriatim reactors in which the present trimetallic hydrocracking catalysts can be used preferably is operated in the first zone at an average catalyst bed temperature of about 340° C. to about 410° C., more preferably at about 350° C. to about 390° C., a total pressure of about 900 psig to about 2,000 psig, more preferably about 1,000 psig to about 1,800 psig, and at a liquid hourly space velocity (LHSV) of about 0.1 $h^{-1}$ to about 2 $h^{-1}$, and more preferably about 0.25 $h^{-1}$ to about 1 $h^{-1}$. In the second zone, preferably the average catalyst bed temperature can be in the range of about 250° C. to about 420° C., preferably about 280° C. to about 400° C., more preferably about 300° C. to about 400° C., a total pressure of about 600 psig to about 3,000 psig, preferably about 650 psig to about 2,500 psig, more preferably about 700 psig to about 2,000 psig, and at a liquid hourly space velocity (LHSV) of about 0.1 to about 5 volumes of hydrocarbon per hour per volume of catalyst, preferably about 0.25 $h^{-1}$ to about 1 $h^{-1}$.

The specific process conditions and the number of reactors or hydrocracking stages to be utilized in any given instance depend to a large extent on the desired end products as will be illustrated in greater detail hereinbelow. The process temperature in the reactors can be the same or different, again depending on the desired end products.

The hydrogen-to-hydrocarbon feedstock charge ratio in both zones for a hydrocracking process using a tri-elemental catalyst preferably is about 500 $Nm^3/m^3$ to about 3,000 $Nm^3/m^3$, more preferably about 1,000 $Nm^3/m^3$ to about 2,500 $Nm^3/m^3$, again depending upon the desired end product and its aromatic content. ($Nm^3=m^3$@STP). The above conditions provide an optimum environment for operation utilizing the present catalyst characterized hereinabove.

If the feedstock contains sulfur or nitrogen, these elements are converted to hydrogen sulfide ($H_2S$) and ammonia ($NH_3$), respectively, during the process. Inasmuch as both hydrogen sulfide and ammonia can adversely affect the process if present in excessive amounts, preferably these gases are removed prior to hydrocracking, i.e., during the separation and/or purification step. Preferably the hydrogen sulfide partial pressure in the hydrocracking stages, especially in Zone 2 as shown in FIG. 1, is maintained below about 50 psi, and the ammonia partial pressure is maintained below about 0.1 psi.

The following examples are offered as illustrations of the invention described herein. Nothing in these Examples is to be construed as a limitation to the scope of the invention except within the limits of the claims appended hereto.

EXAMPLE 1

Hydrocracking Using a Supported NiWRu Catalyst

Supported catalysts having the pore diameter distribution as given in Table I, above, and the respective compositions set forth in Table III, below, were used under typical hydrocracking conditions with previously hydrotreated cracked feedstock. The process conditions for hydrocracking in both instances were as follows:

Reaction temperature: 380° C.

Total pressure: 800 psig

Space velocity (LHSV): 0.55 $h^{-1}$ $H_2$/Hydrocarbon ratio: 1000 $Nm^3/m^3$ $H_2S$ partial pressure @inlet (psi): 0

$NH_3$ partial pressure @inlet (psi): 0

The process flow diagram is shown in FIG. 1, starting with the hydrotreating stage and followed by separation and gas phase purification to maintain the hydrogen sulphide and ammonia partial pressures within specified limits at the hydrocracking stage.

TABLE III

| Catalyst Composition | W—Ni—Ru Catalyst | Supported W—Ni Catalyst | Supported W—Ni—Pd Catalyst |
|---|---|---|---|
| WO$_3$, wt.-% | 20 | 20 | 20 |
| NiO, wt.-% | 6 | 6 | 5 |
| RuO$_2$, wt.-% | 0.6 | — | — |
| PdO$_2$, wt.-% | — | — | 1 |
| TiO$_2$ + Al$_2$O$_3$, wt.-% | 73.4 | 74 | — |
| SiO$_2$ + Al$_2$O$_3$, wt.-% | — | — | 74 |
| Properties of Feedstock A: | | | |
| Degrees A.P.I.: | | | 26.0 |
| Sulfur, wt.-% | | | 0.394 |
| Nitrogen, ppm: | | | 460 |
| 370° C. + fraction, vol.-%: | | | 42 |
| Aromatics, vol. %: | | | 55 |

Results from the foregoing treatment are compiled in Table IV, below.

TABLE IV

Processing Results

| | HDS$^1$ % | MHC$^3$ % | AS$^4$ % |
|---|---|---|---|
| W—Ni—Ru Catalyst | 93.4 | 23.8 | 22.6 |
| Supported W—Ni Catalyst | 84.7 | 20.0 | 13.0 |
| Supported W—Ni—Pd Catalyst | 80.0 | 18.0 | 15.0 |

$^1$Hydrodesulfurization activity
$^2$Hydrocracking activity
$^4$Aromatic saturation activity The foregoing data demonstrate the positive effect of ruthenium, incorporated as described hereinabove, in combination with the Ti-Al support on hydrodesulfurization, hydrocracking, as well as reduction of aromatics under the herein contemplated processing conditions.

EXAMPLE 2

Hydrocracking Using A Catalyst Prepared By Two- or Three- Stage Impregnation

Feedstock A

| Reaction Temperature: | 380° |
|---|---|
| Total Pressure: | 800 psig |
| Space Velocity | 0.55 h$^{-1}$ |
| H$_2$/Hydrocarbon | 1000 Nm$^3$/m$^3$ |
| H$_2$S Partial pressure @ inlet | 0 psi |
| NH$_3$ partial pressure @ inlet | 0 psi |

TABLE V

Catalyst Composition

W—Ni—Ru Catalyst

| Catalyst Composition | Two-Stage Preparation | Three-Stage Preparation | Catalyst Ni—W | Ni—W Catalyst + Ru* |
|---|---|---|---|---|
| WO$_3$ | 20 | 20 | 20 | 19.9 |
| NiO | 6 | 6 | 6 | 5.98 |
| RuO$_2$ | 0.6 | 0.58 | — | 1 |
| TiO/Al$_2$O$_3$ | 73.4 | 73.6 | 74 | 73.8 |

TABLE V-continued

Catalyst Composition

W—Ni—Ru Catalyst

| Catalyst Composition | Two-Stage Preparation | Three-Stage Preparation | Catalyst Ni—W | Ni—W Catalyst + Ru* |
|---|---|---|---|---|

*Prepared by impregnation of Ru on NiW Catalyst using methodology described herein.

TABLE VI

Catalyst Dispersion (XPS)

W—Ni—Ru Catalyst

| Catalyst Composition | Two-Stage Preparation | Three-Stage Preparation | Catalyst Ni—W | Ni—W Catalyst + Ru |
|---|---|---|---|---|
| W / Me | 8 | 7.7 | 3.0 | 4.0 |
| Ni / Me | 5 | 4.9 | 3.5 | 3.0 |
| Ti / Me | 6.5 | 6.4 | 3.0 | 2.8 |

Results from the foregoing treatment are compiled in Table VII, below.

TABLE VII

Catalyst Activity With Feedstock A

| | Activity | | |
|---|---|---|---|
| Catalyst | HDS % | MHC % | AS % |
| W—Ni—Ru Catalyst Two Stage Impr. | 93.4 | 23.8 | 22.6 |
| W—Ni—Ru Catalyst Three Stage Impr. | 92.0 | 25.0 | 28.5 |
| W—Ni Supported Catalyst | 84.7 | 20.0 | 13.0 |
| Supported W—Ni Catalyst + Ru* | 87.0 | 17.0 | 18.0 |

*Prepared by impregnation of Ru on NiW Catalyst using methodology described herein.

The foregoing data demonstrate the positive effect of ruthenium, whether added in a two- or three-stage impregnation so as to maximize dispersion of the metals. Ruthenium added to "standard" prepared catalyst in a similar manner does not provide the same performance.

EXAMPLE 3

Effect Of Operating Conditions

The effect of operating conditions on the trimetallic catalyst were studied using Feedstock A. The process conditions are presented in Table VIII, below.

TABLE VIII

| | Process Conditions | | | |
|---|---|---|---|---|
| | W—Ni—Ru / Ti—Al | | W—Ni/Ti—Al | W—Ni + Ru*/Ti—Al |
| Conditions | Two Stage | Three Stage | Two Stage | Two Stage |
| Gas Phase, vol.-% (Based On Void Volume) | 65 | 65 | 48 | 48 |
| Temperature of Reaction, °C. | 380 | 370/390 | 380 | 380 |
| Total Reactor Pressure, psig | 1500 | 1500 | 2200 | 2200 |
| Space Velocity, hr$^{-1}$ | 0.5 | 0.5 | 0.5 | 0.5 |
| H$_2$/Hydrocarbon, Nm$^3$/m$^3$ | 2000 | 2000 | 800 | 800 |
| H$_2$S Part. Press., psi | 1 | 1 | 1 | 1 |

*Prepared by impregnation of Ru on NiW Catalyst using methodology described herein.

Results from the foregoing treatment are compiled in Table IX, below.

TABLE IX

| | Process Results | | | | |
|---|---|---|---|---|---|
| | Hydrocracking % V/Wt | | | | |
| Process | Jet Fuel | Diesel | Gasol. | C$_1$–C$_4$ | AS % |
| W—Ni—Ru/Ti—Al Two Stage | 20 | 55 | 5 | 5 | 50 |
| W—Ni—Ru/Ti—Al Three Stage | 40 | 40 | 7 | 6 | 45 |
| W—Ni/Ti—Al Two Stage | 20 | 30 | 12 | 8.5 | 30 |
| W—Ni—Ru*/Ti—Al Two Stage | 25 | 35 | 10 | 7.0 | 40 |

*Prepared by impregnation of Ru in NiW Catalyst using methodology described herein.

These data demonstrate the flexibility of the present process to produce relatively high or relatively low ratio of jet fuel/diesel fuel as desired. The data also demonstrate the relatively higher selectivity of the trimetatlic catalyst in comparison with others under the present process conditions even at higher total process pressure. The difference in gasoline and gas formation is particularly noteworthy.

EXAMPLE 4

Effect of Hydrogen Sulphide Partial Pressure

The effect of H$_2$S partial pressure on aromatic content of the product was investigated using the following feedstocks:

| Feedstock B: | 30% of LCCO | (Light catal. gas oil) |
|---|---|---|
| | 40% of HKGO | (Heavy coker gas oil) |
| | 30% of HVGO | (Heavy vacuum gas oil) |
| Feedstock C: | 40% of HKGO | |
| | 50% of HVGO | |
| | 10% of DAO | (Despalted oil) |

TABLE X

| | Hydrocracking Feed Properties (After Hydrotreating in accordance with U.S. Pat. No. 5,099,768) | |
|---|---|---|
| Feed Properties | Feedstock B | Feedstock C |
| Sulphur, ppm | 1300 | 1200 |
| Nitrogen, ppm | 300 | 390 |
| Aromatic, vol.-% | 55 | 53 |
| Paraffins, vol.-% | 5 | 7 |
| Boiling Range, °C./vol.-% | 250–500/100% | 280–500/95% |

TABLE XI

| | Hydrocracking Operating Conditions | | | |
|---|---|---|---|---|
| | Process Conditions | | | |
| Process Parameter | 1 | 2 | 3 | 4 |
| Pressure, psig | 1800 | 1800 | 1800 | 1800 |
| Space Velocity, h$^{-1}$ | 0.5 | 0.5 | 0.5 | 0.5 |
| H$_2$S Part.Press., psi | 0 | 1 | 5 | 10 |
| Gas Phase, vol.-% | 60 | 60 | 60 | 60 |
| No. of Reactors | One | One | One | One |

An unexpected beneficial effect of the hydrocracking process is clearly demonstrated for better aromatic saturation as well as sulfur removal.

The effect is the same for other feedstocks such as Feedstock C. Table XII, below, shows the observed results.

TABLE XII

| | Processing Results | | |
|---|---|---|---|
| | Aromatics In Product, Vol.-% | | |
| | See Conditions, Table XI | | |
| Feed | 1 | 2 | 3 |
| Feedstock B | 21 | 11 | 12 |
| Feedstock C | 25 | 15 | 16 |

TABLE XII-continued

Processing Results

Hydroconversion, Vol.-%

See Conditions, Table XI

| Feed | 1 | 2 | 3 |
|---|---|---|---|
| Feedstock B | 25 | 23 | 23 |
| Feedstock C | 29 | 25 | 25 |

These examples demonstrate that the use of the trimetallic catalyst in the present process can produce selective hydrocracking to diesel and jet fuel from cracked feedstock. High quality diesel production is demonstrated in Example 5, below.

EXAMPLE 5: High Quality Diesel Production

Feedstock B (Example 4) was processed under the following conditions:

| | |
|---|---|
| Pressure, psig | 1800 |
| Space velocity, $hr^{-1}$ | 0.5 |
| $H_2S$ partial pressure @ inlet of Zone 1, psi | 10 |
| $H_2S$ partial pressure @ inlet of Zone 2, psi | 5 |
| $NH_3$ partial pressure @ inlet of Zone 1, psi | 0.05 |
| Gas phase, vol. -% | 60 |
| No. of reactors | 1 |

Properties of the obtained diesel fuel are compiled in Table XIII, below.

TABLE XIII

Diesel Fuel Properties

| Property | W—Ni—Ru Ti—Al Catalyst | W—Ni/Ti—Al Catalyst |
|---|---|---|
| Sulphur, ppm | 50 | 300 |
| Nitrogen, ppm | 10 | 100 |
| Aromatic, vol. -% | 15 | 25 |
| Cetane Index | 54 | 40 |
| Cloud Point, °C. | 25 | 0 |

The observed difference in cloud point, associated with the amount of isoparaffinic material in the diesel fraction, is particularly noteworthy.

EXAMPLE 6

Two Zone Process

The process of this invention was compared with an alternative process not utilizing the catalyst of the second zone as contemplated by the present invention.

The process of the invention was tested in a fixed bed reactor having catalyst beds loaded as set forth in Table XIV, below:

TABLE XIV

Catalyst Loading

| | Bed Volume (cc) | Catalyst System |
|---|---|---|
| BED 1 | 70 | NiWPd / $TiO_2$—$Al_2O_3$ [Catalyst (1)] |
| BED 2 | 30 | NiWPd / (Ni—Pd) ZSM5-$TiO_2$—$Al_2O_3$ [Catalyst (2)] |

The comparative process was carried out in a reactor loaded with 100 cc of NiWPd/$TiO_2$-$Al_2O_3$ catalyst.

The comparative process and the process in accordance with the invention were used to convert a vacuum gas oil plus a light cycle oil feedstocks to medium distillate products. Both the comparative and the process of the invention test runs were carried out at temperature of 360° C., total pressure of 1200 psig, space velocity of $1h^{-1}$ and at a hydrogen-to-hydrocarbon ratio of 1200 $Nm^3/m^3$.

Table XV below sets forth the properties of the feedstocks used in each test run.

TABLE XV

Feed Properties

| | VGO + LGO | DAO | HVGO |
|---|---|---|---|
| API Gravity | 16.8 | 20 | 22 |
| Pour Point, °C. | +26 | +51 | +45 |
| Hydrogen, wt-% | 10.2 | 12.3 | 12.4 |
| Sulfur, wt-% | 1.7 | 1.5 | 1.4 |
| Nitrogen, ppm | 1591 | 1710 | 1400 |
| Aromatics, wt-% | 61 | 49 | 45 |
| TBP Curve, °C. | | | |
| 5 v% | 227 | 478 | 426 |
| 10 | 248 | 504 | 442 |
| 30 | 323 | 559 | 475 |
| 50 | 372 | 582 | 497 |
| 70 | 419 | — | 522 |
| 90 | 483 | — | — |

VGO/LGO: 40%/60%
DAO: Deasphalted oil
HVGO: Heavy vacuum gas oil

The chemical composition of the catalysts is reported in Table XVI, below.

TABLE XVI

| | Catalyst Composition | |
|---|---|---|
| Chemical Composition | NiWPd/TiO$_2$—Al$_2$O$_3$ Catalyst (1) | NiWPd/(Ni—Pd)ZSM5-TiO$_2$—Al$_2$O$_3$ Catalyst (2) |
| WO$_3$, wt-% | 20 | 17 |
| NiO, wt-% | 6 | 4 |
| TiO$_2$, wt-% | 7.4 | 3.9 |
| Pd ppm | 1000 | 1000 |
| Al$_2$O$_3$, wt-% | 66.4 | 63.2 |
| Me-Zeolite, wt-% | — | 11.9 |

The physical properties of the catalysts are reported in Table XVII, below.

TABLE XVII

| | Catalyst Properties | |
|---|---|---|
| Physical Properties | NiWPd/TiO$_2$—Al$_2$O$_3$ Catalyst (1) | NiWPd/(Ni—Pd)ZSM5-TiO$_2$—Al$_2$O$_3$ Catalyst (2) |
| Surface Area, m$^2$g | 220 | 260 |
| Pore Volume, cm$^3$/g | 0.52 | 0.51 |
| Mean Pore Diameter, nm | 70 | 65 |
| Crush strength, Kg/cm$^2$ | 9.4 | 8.6 |
| Pore Size Distribution, (Å) | Distribution, % | |
| <30 | 5 | 5.6 |
| 30–60 | 27 | 18.6 |
| 60–90 | 28 | 18.3 |
| 90–150 | 25 | 20.8 |
| 150–300 | 6 | 15.6 |
| 300–600 | 6 | 18.0 |
| >600 | 3 | 3.1 |

The activities and selectivities for both processes as obtained at the above described operating conditions using the Catalysts (1) and (2) identified in Table XVI, above, are reported in Table XVIII, below.

TABLE XVIII

| | Product Properties | | | | | |
|---|---|---|---|---|---|---|
| | VGO + LGO | | DAO | | HVGO | |
| | (1) | (1) + (2) | (1) | (1) + (2) | (1) | (1) + (2) |
| API Gravity | 30 | 31.5 | 27.4 | 28.2 | 29.5 | 30.3 |
| Pour Point, °C. | +17 | −27 | +39 | −6 | +36 | −15 |
| Sulfur, ppm | 22 | <10 | 200 | 41 | 80 | <10 |
| Nitrogen, ppm | 2 | <1 | 86 | 27 | 34 | 10 |
| Aromatics, wt-% | 15 | 15 | 22 | 19 | 19 | 21 |
| TBP Curve, °C. | | | | | | |
| 5 v% | 190 | 178 | 330 | 325 | 320 | 296 |
| 10 | 212 | 205 | 389 | 373 | 360 | 358 |
| 30 | 271 | 265 | 510 | 505 | 438 | 433 |
| 50 | 323 | 318 | 570 | 568 | 471 | 470 |
| 70 | 388 | 378 | — | — | 504 | 502 |
| 90 | 462 | 450 | — | — | — | — |

The foregoing data illustrate the positive effect of the two-zone catalytic process on the pour point properties of the products.

EXAMPLE 7

Catalyst Performance Comparison

The process of the invention utilizing a NiWRu/(Ru) ZSM5-TiO$_2$-Al$_2$O$_3$ catalyst in the second zone was compared with an alternative single catalyst bed process.

TABLE XIX

| | Catalyst Loading | |
|---|---|---|
| | Bed Volume (cc) | Catalyst System |
| BED 1 | 70 | NiWPd / TiO$_2$—Al$_2$O$_3$ [Catalyst (1)] |
| BED 2 | 30 | NiWRu / (Ru)ZSM5-TiO$_2$—Al$_2$O$_3$ [Catalyst (3)] |

The alternative process was run using 100 cc of Catalyst 1.

The chemical composition of the ZSM-zeolite catalyst is reported in Table XX, below.

TABLE XX

| | Catalyst Composition |
|---|---|
| Chemical Composition | NiWRu/(Ru)ZSM5-TiO$_2$—Al$_2$O$_3$ Catalyst (3) |
| WO$_3$, wt-% | 20 |
| NiO, wt-% | 6 |

TABLE XX-continued

Catalyst Composition

| Chemical Composition | NiWRu/(Ru)ZSM5-TiO$_2$—Al$_2$O$_3$ Catalyst (3) |
|---|---|
| Ru, ppm | 1000 |
| Al$_2$O$_3$, wt-% | 63 |
| Me-Zeolite, wt-% | 11 |

The physical properties of the catalysts are reported in Table XXI, below.

TABLE XXI

Catalyst Properties

| Physical Properties | NiWPd/TiO$_2$—Al$_2$O$_3$ Catalyst (1) | NiWRu/(Ru)ZSM5-TiO$_2$—Al$_2$O$_3$ Catalyst (3) |
|---|---|---|
| Surface Area m$^2$/g | 220 | 340 |
| Pore Volume, cm$^3$/g | 0.52 | 0.60 |
| Mean Pore Diameter, nm | 70 | 70 |
| Crush strength, Kg/cm$^2$ | 9.4 | 8.2 |

| Pore Size Distribution, (Å) | Distribution, % | |
|---|---|---|
| <30 | 5 | 2.1 |
| 30–60 | 27 | 22.7 |
| 60–90 | 28 | 56.2 |
| 90–150 | 25 | 14.6 |
| 150–300 | 6 | 2.4 |
| 300–600 | 6 | 1.2 |
| >600 | 3 | 0.8 |

The activities and selectivities for the processes as obtained at the above described operating conditions using the Catalysts (1), (2) and (3) identified in Tables XVI and XX, above, are reported in Table XXII, below.

TABLE XXII

Product Properties

| | VGO + LGO | | | DAO | | | HVGO | | |
|---|---|---|---|---|---|---|---|---|---|
| | (1) | (1) + (2) | (1) + (3) | (1) | (1) + (2) | (1) + (3) | (1) | (1) + (2) | (1) + (3) |
| API Gravity | 30 | 31.5 | 32.3 | 27.4 | 28.2 | 29.6 | 29.5 | 30.3 | 31.2 |
| Pour Point, °C. | +17 | −27 | −6 | +39 | −6 | +6 | +36 | −15 | −3 |
| Sulfur, ppm | 22 | <10 | <10 | 200 | 41 | <10 | 80 | <10 | <10 |
| Nitrogen, ppm | 2 | <1 | <1 | 86 | 27 | 4 | 34 | 10 | 4 |
| Aromatics, wt-% | 15 | 15 | 10 | 22 | 19 | 14 | 19 | 21 | 12 |

The foregoing example also demonstrates the positive effect of Ni-Pd exchanged metals versus ruthenium-exchanged metal in the ZSM5 zeolite on the product properties.

EXAMPLE 8

Ru-Containing Y-Zeolite Catalyst Performance

The process conditions of the invention were duplicated utilizing a NiWRu/(Ru)Y-zeolite-Al$_2$O$_3$ catalyst in the second zone.

TABLE XXIII

Catalyst Loading

| | Bed Volume (cc) | Catalyst System |
|---|---|---|
| BED 1 | 70 | NiWPd / TiO$_2$—Al$_2$O$_3$ [Catalyst (1)] |
| BED 2 | 30 | NiWRu/(Ru)Y-zeolite-Al$_2$O$_3$ [Catalyst (4)] |

The chemical composition of the catalyst is reported in Table XXIV, below.

TABLE XXIV

Catalyst Composition

| Chemical Composition | NiWRu/(Ru)Y-zeolite-Al$_2$O$_3$ Catalyst (4) |
|---|---|
| WO$_3$, wt-% | 20 |
| NiO, wt-% | 6 |
| Ru, ppm | 1000 |
| Al$_2$O$_3$, wt-% | 63 |
| Zeolite, wt-% | 11 |

The physical properties of the Y-zeolite catalyst are reported in Table XXV, below.

TABLE XXV

Catalyst Properites

| Physical Properties | NiWRu/(Ru)Y-zeolite-$Al_2O_3$ Catalyst (4) |
|---|---|
| Surface Area, $m^2/g$ | 244 |
| Pore Volume, $cm^3/g$ | 0.49 |
| Mean Pore Diameter, nm | 75 |
| Crush strength, $Kg/cm^2$ | 7.8 |

| Pore Size Distribution, (Å) | Distribution, % |
|---|---|
| <30 | 3.3 |
| 30–60 | 23.8 |
| 60–90 | 14.0 |
| 90–150 | 24.3 |
| 150–300 | 21.3 |
| 300–600 | 11.1 |
| >600 | 2.2 |

The activities and selectivities obtained using Catalyst (4) at the above described operating conditions are presented for comparison vis-a-vis Catalyst (3) in Table XXVI, below.

TABLE XXVI

Product Properties

| | VGO + LGO | | DAO | | HVGO | |
|---|---|---|---|---|---|---|
| | (1) + (3) | (1) + (4) | (1) + (3) | (1) + (4) | (1) + (3) | (1) + (4) |
| API Gravity | 32.3 | 34 | 29.6 | 31.2 | 31.2 | 32.7 |
| Pour Point, °C. | −26 | −20 | −6 | −3 | −13 | −9 |
| Sulfur, ppm | <10 | <10 | <10 | <10 | <10 | <10 |
| Nitrogen, ppm | <1 | <1 | 4 | <1 | 4 | <1 |
| Aromatics, wt-% | 10 | 8 | 14 | 13 | 12 | 10 |
| TBP Curve, °C. | | | | | | |
| 5 v% | 175 | 150 | 323 | 305 | 297 | 282 |
| 10 | 203 | 175 | 376 | 352 | 357 | 326 |
| 30 | 265 | 240 | 506 | 433 | 430 | 376 |
| 50 | 319 | 302 | 565 | 477 | 468 | 405 |
| 70 | 376 | 358 | — | 520 | 501 | 461 |
| 90 | 450 | 372 | — | — | — | — |

The foregoing example illustrates the positive effect achievable with the ZSM5 zeolite and titania catalyst support versus Y-zeolite catalyst support on the product properties.

The foregoing specification, including the examples, is intended to be illustrative, but is not to be taken as limiting the present invention. Still other variations within the spirit and scope of this invention are possible and will readily present themselves to those skilled in the art.

We claim:

1. A multi-zone hydrogenation and hydrocracking process suitable for a petroleum hydrocarbon feedstock that contains sulfur, nitrogen, and aromatic components, which process comprises:

contacting said hydrocarbon feedstock, in a first process zone and under hydrocracking conditions, with a particulate catalyst constituted by a porous support comprising alumina and titania wherein the alumina is present in an amount in the range of about 95 weight percent to about 70 weight percent, and wherein the titania is present in an amount of about 5 to about 30 weight percent, both based on the weight of the support, and by a catalytically active tri-elemental phase on the support consisting essentially of a transition element of Group VI-B of the Periodic Table of Elements, a transition element of the first transition series of Group VIII of the Periodic Table of Elements, and a transition element of the second transition series of Group VIII of the Periodic Table of Elements; said porous support having a surface area in the range of about 130 $m^2$/gram to about 300 $m^2$/gram and at least about 95 percent of the pores thereof having a pore diameter in the range of about 20 Angstroms to about 500 Angstroms; and said Group VI-B transition element being present in an amount in the range of about 6 weight percent to about 30 weight percent, expressed as weight of the corresponding oxide and based on the weight of the catalyst, said Group VIII first transition series element being present in an amount in the range of about 2 weight percent to about 10 weight percent, expressed as weight of the corresponding oxide and based on the weight of the catalyst, and said Group VIII second transition series element being present in an amount in the range of about 0.01 weight percent to about 1 weight percent, based on the weight of the catalyst, for a time period sufficient to convert at least a portion of said cracked petroleum hydrocarbon feedstock into an effluent having relatively lower aromatic content; and thereafter contacting said effluent, in a second process zone and under hydrocracking conditions, with a particulate catalyst constituted by a porous, catalytically active support comprising alumina, titania and a pentasil crystalline zeolite in which the alumina is present in an amount in the range of about 95 parts by weight to about 70 parts by weight, the titania is present in an amount in the range of about 0.01 parts by weight to about 10 parts by weight, and the zeolite is present in an amount in the range of about 5 to about 50 parts by weight, said porous support having a surface area in the range of about 200 $m^2$/gram to about 450 $m^2$/gram and at least about 95 percent of the pores thereof having a pore diameter in the range of about 20 Angstroms to about 600 Angstroms, and three catalytically-active moieties on said support, said moieties consisting essentially of a transition element of Group VIB of the Periodic Table of Elements, a transition element of the first transition series of Group VIII of the Periodic Table of Elements, and a transition element of the second transition series of Group VIII of the Periodic Table of Elements, said Group VIB transition element being present in an amount in the range of about 5 weight percent to about 30 weight percent, expressed as the weight of the corresponding oxide and based on the weight of the catalyst, said Group VIII first transition series element being present in an amount in the range of about 2 weight percent to about 10 weight percent, expressed as the weight of the corresponding oxide and based on the weight of the catalyst, and said Group VIII second transition series element being present in an amount in the range of about 0.005 weight percent to about 1 weight percent, expressed as the weight of the metal and based on the weight of the catalyst, for a time period sufficient to lower the pour point of said effluent.

2. The hydrogenation and hydrocracking process in accordance with claim 1 wherein said hydrocracking conditions in the second zone include a catalyst bed temperature in the range of about 250° C. to about 420° C., a pressure in the range of about 600 to about 3,000 psig, a liquid hourly space velocity in the range of about $0.1\ h^{-1}$ to about $5\ h^{-1}$, and a hydrogen-to-hydrocarbon feedstock ratio in the range of about 500 $Nm^3/m^3$ to about 3,000 $Nm^3/m^3$.

3. The hydrogenation and hydrocracking process in accordance with claim 1 wherein said hydrocracking conditions in the second zone include a catalyst bed temperature in the range of about 280° C. to about 400° C., a pressure in the range of about 650 psig to about 2,500 psig, a liquid hourly space velocity of about $0.25\ h^{-1}$ to about $1\ h^{-1}$, a hydrogen-to-hydrocarbon feedstock ratio in the range of about 1,000 $Nm^3/m^3$ to about 2,500 $Nm^3/m^3$, and a hydrogen sulfide partial pressure of no more than about 50 psi.

4. A hydrocracking and hydrogenation process suitable for a petroleum hydrocarbon feedstock which process comprises:

contacting said hydrocarbon feedstock, having an aromatic content above about 40 percent by volume, in a reactor, in a first process zone and under hydrocracking conditions wherein a mixture of hydrogen gas and hydrocarbon vapor occupies at least 60 percent of the reactor void volume, with a particulate catalyst constituted by a porous support comprising alumina and titania; wherein the alumina is present in an amount in the range of about 95 weight percent to about 70 weight percent, and wherein the titania is present in an amount of about 5 to about 30 weight percent, both based on the weight of the support, and by a catalytically active tri-elemental phase on the support consisting essentially of a transition element of Group VI-B of the Periodic Table of Elements, a transition element of the first transition series of Group VIII of the Periodic Table of Elements, and a transition element of the second transition series of Group VIII of the Periodic Table of Elements; said porous support having a surface area in the range of about 130 $m^2$/gram to about 300 $m^2$/gram and at least about 95 percent of the pores thereof having a pore diameter in the range of about 20 Angstroms to about 500 Angstroms; and said Group VI-B transition element being present in an amount in the range of about 6 weight percent to about 30 weight percent, expressed as weight of the corresponding oxide and based on the weight of the catalyst, said Group VIII first transition series element being present in an amount in the range of about 2 weight percent to about 10 weight percent, expressed as weight of the corresponding oxide and based on the weight of the catalyst, and said Group VIII second transition series element being present in an amount in the range of about 0.01 weight percent to about 1 weight percent, based on the weight of the catalyst, for a time period sufficient to convert at least a portion of said hydrocarbon feedstock into an effluent having an aromatic content less than about 20 percent by volume; and thereafter contacting said effluent, in a second process zone and under hydrocracking conditions, with a particulate catalyst constituted by a porous catalytically active support comprising alumina, titania and a pentasil crystalline zeolite in which the alumina is present in an amount in the range of about 95 parts by weight to about 70 parts by weight, the titania in an amount in the range of about 0.01 parts by weight to about 10 parts by weight, and the zeolite is present in an amount of about 5 to about 50 parts by weight, said porous support having a surface area in the range of about 200 $m^2$/gram to about 450 $m^2$/gram and at least about 95 percent of the pores thereof having a pore diameter in the range of about 20 Angstroms to about 600 Angstroms, and three catalytically-active moieties on said support, said moieties consisting essentially of a transition element of Group VIB of the Periodic Table of Elements, a transition element of the first transition series of Group VIII of the Periodic Table of Elements, and a transition element of the second transition series of Group VIII of the Periodic Table of Elements, said Group VIB transition element being present in an amount in the range of about 5 weight percent to about 30 weight percent, expressed as the weight of the corresponding oxide and based on the weight of the catalyst, said Group VIII first transition series element being present in an amount in the range of about 2 weight percent to about 10 weight percent, expressed as the weight of the corresponding oxide and based on the weight of the catalyst, and said Group VIII second transition series element being present in an amount in the range of about 0.005 weight percent to about 1 weight percent, expressed as the weight of the metal and based on the weight of the catalyst, for a time period sufficient to lower the pour point of said effluent.

5. The hydrocracking and hydrogenation process in accordance with claim 4 wherein at least about 80 percent of the reactor void volume is occupied by a mixture of hydrogen gas and hydrocarbon vapor.

6. The process of claim 4 wherein said Group VI-B element in said catalysts is tungsten.

7. The process of claim 4 wherein said Group VI-B element in said catalysts is molybdenum.

8. The process of claim 4 wherein said transition element of the first series of Group VIII in said catalysts is nickel.

9. The process of claim 4 wherein said transition element of the first transition series of Group VIII in said catalysts is cobalt.

10. The process of claim 4 wherein said transition element of the second transition series of Group VIII in said catalysts is ruthenium.

11. The process of claim 4 wherein said transition element of the second transition series of Group VIII in said catalysts is palladium.

12. The process of claim 4 wherein said catalytically active moieties in said catalysts consist essentially of tungsten, nickel and ruthenium.

13. The process of claim 4 wherein said catalytically active moieties in said catalysts consist essentially of tungsten, nickel and palladium.

14. The process of claim 4 wherein said pentasil crystalline zeolite is a ZSM-5 zeolite.

15. The process of claim 4 wherein said pentasil crystalline zeolite has a Si/Al atomic ratio in the range of about 20 to about 80.

16. The process of claim 4 wherein said pentasil crystalline zeolite includes an element of the first transition series of Group VIII and an element of the second transition series of Group VIII.

17. The process of claim 16 wherein the transition element of the first transition series of Group VIII elements on the zeolite is nickel.

18. The process of claim 16 wherein the transition element of the second transition series of Group VIII elements on the zeolite is palladium.

19. The process of claim 16 wherein the transition element of the second transition series of Group VIII elements on the zeolite is ruthenium.

20. The process of claim 16 wherein the Group VIII first transition series element is present on the zeolite in an amount in the range of about 0.005 weight percent to about 2 weight percent, expressed as weight of the corresponding metal and based on the weight of the zeolite.

21. The process of claim 16 wherein the Group VIII second transition series element is present on the zeolite in an amount in the range of about 0.005 weight percent to about 2 weight percent, expressed as weight of the corresponding metal and based on the weight of the zeolite.

22. The process of claim 4 wherein the feedstock is a middle distillate oil.

23. The process of claim 4 wherein the feedstock is a deasphalted oil.

24. The process of claim 4 wherein the feedstock is a heavy vacuum gas oil.

25. The process of claim 4 wherein in the second process zone hydrogen sulfide partial pressure is no more than about 50 psi, and ammonia partial pressure is no more than about 0.1 psi.

* * * * *

UNITED STATES PATENT AND TRADEMARK OFFICE
CERTIFICATE OF CORRECTION

PATENT NO. : 5,558,766
DATED : September 24, 1996
INVENTOR(S) : Ricardo Prada, Edilberto Rodriguez & Roberto Galiasso It is certified that error appears in the above-indentified patent and that said Letters Patent is hereby corrected as shown below:

Title page, item "[75] Inventors:", delete inventors Yilda Romero and Edito Reyes.

Title page, item "[75] Inventors:" should read as follows:
— Ricardo Prada, Caracas; Edilberto Rodriguez, Miranda; Roberto Galiasso, Miranda, all of Venezuela —

Col. 2, line 9, "obtainsspecific" should be — obtain specific —.
Col. 3, line 36, "extrudabe" should be — extrudable —.
Col. 19, in Table XVII, "Surface Area, m²g" should be — Surface Area, $m^2/g$ —.
Col. 21, in Table XXI, after "Surface Area" insert a comma (,).

Signed and Sealed this

Fourteenth Day of January, 1997

Attest:

BRUCE LEHMAN

Attesting Officer

Commissioner of Patents and Trademarks